US006345275B2

(12) United States Patent
Lee

(10) Patent No.: US 6,345,275 B2
(45) Date of Patent: Feb. 5, 2002

(54) APPARATUS AND METHOD FOR RETRIEVING IMAGE INFORMATION IN COMPUTER

(75) Inventor: Hee-Jong Lee, Seoul (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/107,384

(22) Filed: Jun. 30, 1998

(30) Foreign Application Priority Data

Jul. 31, 1997 (KR) .......................................... 97-366575

(51) Int. Cl.$^7$ .............................................. G06F 17/30
(52) U.S. Cl. ........................................... 707/6; 382/190
(58) Field of Search ........................... 707/1, 102, 104, 707/201, 205, 2–6; 382/168–181, 190–191

(56) References Cited

U.S. PATENT DOCUMENTS

| 4,716,404 A | * | 12/1987 | Tabata et al. ................ 340/723 |
| 5,715,336 A | * | 2/1998 | Tanaka ........................ 382/301 |
| 5,734,882 A | * | 3/1998 | Lopresti et al. ............. 395/600 |
| 5,802,208 A | * | 9/1998 | Podilchuk et al. ........... 382/224 |
| 5,809,498 A | * | 9/1998 | Lopresti et al. ................ 707/6 |
| 5,819,288 A | * | 10/1998 | De Bonet ................... 707/104 |
| 5,828,769 A | * | 10/1998 | Burns ......................... 381/118 |
| 5,867,277 A | * | 2/1999 | Melen et al. ................ 358/296 |
| 5,867,593 A | * | 2/1999 | Fukuda et al. .............. 382/176 |
| 5,899,999 A | * | 5/1999 | De Bonet ................... 707/104 |
| 5,983,237 A | * | 11/1999 | Jain et al. ................... 707/104 |
| 5,848,186 A | * | 3/2000 | Wang et al. ................ 382/176 |
| 6,035,055 A | * | 3/2000 | Wang et al. ................ 382/118 |
| 6,253,201 B1 | * | 6/2001 | Abdel-Mottaleb et al. ..... 707/4 |
| 6,266,445 B1 | * | 7/2001 | Krtolica et al. ............. 382/209 |

\* cited by examiner

*Primary Examiner*—Thomas Black
*Assistant Examiner*—Mary Wang
(74) *Attorney, Agent, or Firm*—Sughrue Mion, PLLC

(57) ABSTRACT

An apparatus and method for retrieving image information in a computer. A controller receives a schematic image inputted by a user and normalizes the input image to an image of a constant size. A feature vector of each sub block of the normalized image is extracted, and the extracted feature vector is quantized to one of representative values of a determined number within feature vector space. An image profile indicating the frequency of occurrence of the feature vector of the input image is generated with respect to a quantizing level. A profile of the input image is compared with a profile of each image in an image data base part. An image corresponding to a profile whose similarity is within a reference value is displayed.

2 Claims, 2 Drawing Sheets

APPARATUS AND METHOD FOR RETRIEVING IMAGE INFORMATION IN COMPUTER

BACKGROUND OF THE INVENTION

1. Field of the Invention

The present invention relates to a data base retrieving method, and more particularly to an apparatus and method for retrieving image information.

2. Description of the Related Art

In most data base systems, a text-based keyword input method has been used to retrieve desired information, regardless of whether the information is text or image. However, in data base systems for still images, it is difficult to find appropriate keywords corresponding to still image information. Further, during retrieval, it is difficult to guess the exact keyword corresponding to a still image. Therefore, an easy method for retrieving still images from the data base is required.

SUMMARY OF THE INVENTION

An object of the present invention is to provide an apparatus and method for retrieving image information in a computer.

To achieve the above objects, a controller receives a schematic image input by a user and normalizes the input image to an image of a constant size. A feature vector of each sub block of the normalized image is extracted, and the extracted feature vector is quantized to one of a fixed number of quantizing levels within feature vector space. An image profile indicating the frequency of occurrence of a quantizing level in the feature vector of the input image. A profile of the input image is compared with a profile of each image in an image data base part. An image corresponding to a profile whose similarity is within a reference value is displayed.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

In the following description, numerous specific details such as a processing flow are set forth to provide a more thorough understanding of the present invention. It will be apparent, however, to one skilled in the art that the present invention may be practiced without these specific details. In other instances, well known functions and constructions have not been described so as not to obscure the present invention.

Feature Vector represents characteristics of a given block of an image. For example, the feature vector could be the color histogram, or wavelet coefficients representing texture of the image. It can be any vector representing certain characteristic of the image.

Quantized levels are the components of the feature vector. When it is first extracted from the image block it is usually real numbers (continuous). Then, these components are quantized into certain numbers of "levels". For example, the real value x such that 0<x<10 can be quantized into 10 levels by taking x. Herein, [x] is the greatest interger less than x. So, 3.55 is 3 and 4.13 is 4, etc. The quantizing level information is provided by an internal code book.

Figure 1:
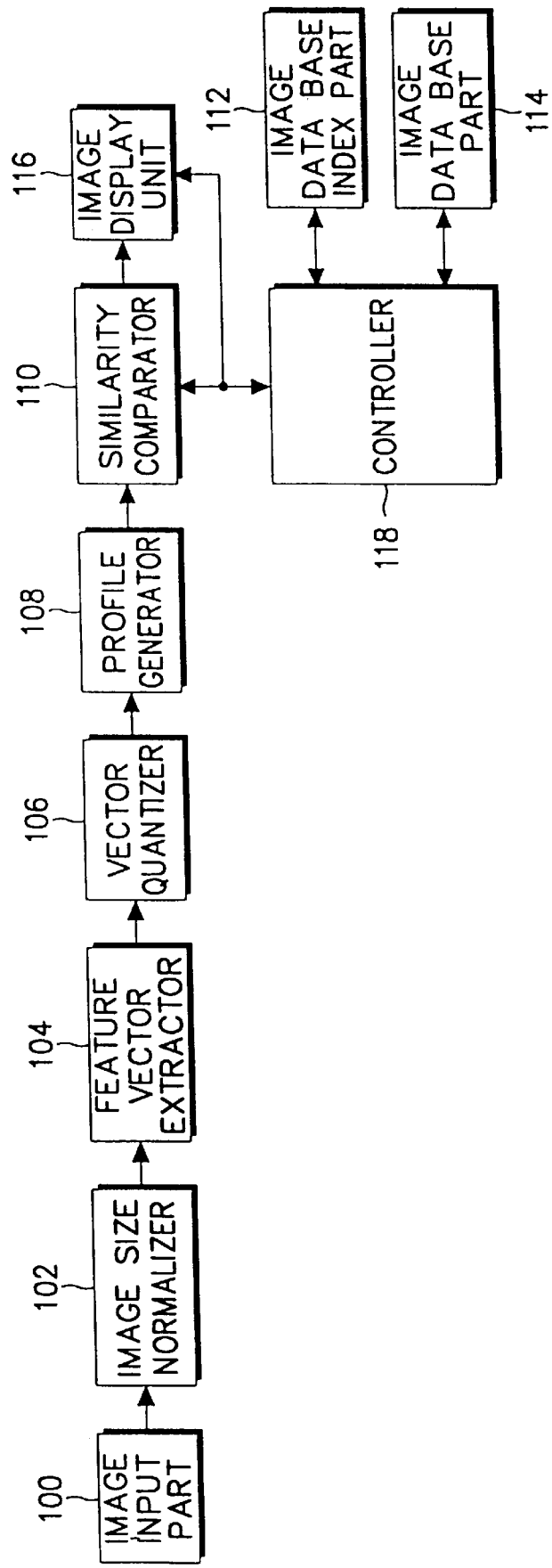
FIG. 1 is a block diagram showing an image information retrieving apparatus according to the present invention.

Referring to FIG. 1, an image input unit 100 inputs a schematic drawing of an image to be retrieved from an image data base unit 114. An image size normalizer 102 normalizes an image received from the image input unit 100 to an image of a preset constant size. A feature vector extractor 104 extracts a feature vector from the normalized input image. A vector quantizer 106 vector-quantizes the feature vector extracted from the feature vector extractor 104 to various quantizing levels according to an internal code book. A profile generator 108 generates a profile showing the feature of the input image in such a manner that the frequency of occurrence of each quantizing level within the feature vector is indicated. A similarity comparator 110 compares a profile of the input image with a profile of an image within the data base and supplies the image in the image data base that is within a similar range to an image display unit 116. An image data base index unit 112 stores the profiles of the image information contained in an image data base unit 114. The image data base unit 114 is a storage device in which the image information is stored. The image display unit 116 displays the image received from the similarity comparator 110. A controller 118 controls the image information retrieving apparatus.

Figure 2:
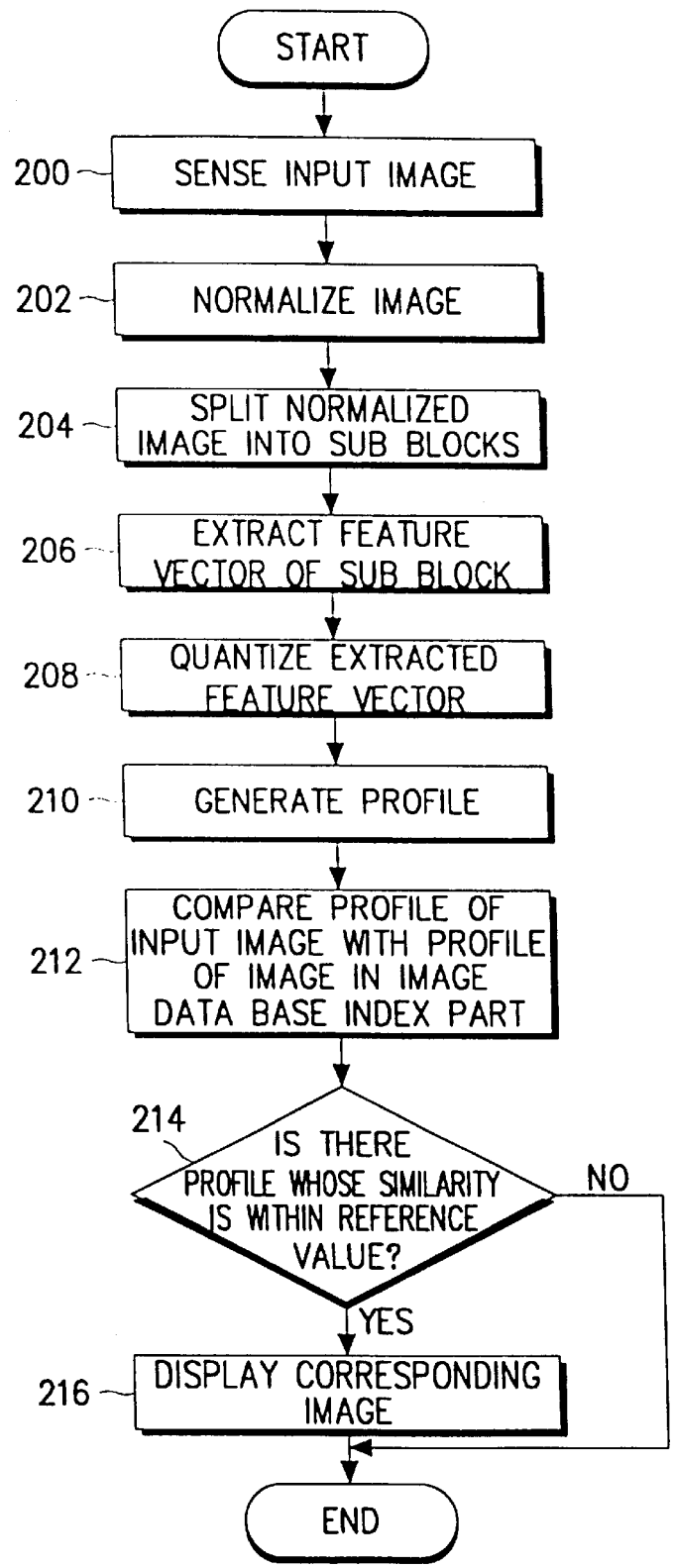
FIG. 2 is a flow chart showing an image information retrieving method according to the present invention.

FIG. 2 shows an image information retrieving method according to the present invention. A user schematically draws the image that is to be searched from the image data base unit 114 in the image input unit 100. The controller 118 senses, at step 200, the input image received from the user. At step 202, the input image is normalized to an image of a preset constant size. The normalized image is split into sub blocks of a preset number at step 204. At step 206, the feature vector of each sub block is extracted. The feature vector may be, for example, a DCT (Discrete Cosine Transform) coefficient of each sub block. At step 208, the extracted feature vector is quantized, and at step 210, the profile indicated as the frequency of occurrence of the quantizing level within the feature vector is generated. At step 212, the profile generated at step 210 is compared with the profile for each image in data base in the image data base index unit 112. It is checked at step 214 whether there is a profile whose similarity is within a reference value. If so, the corresponding image is read from the image data base unit 114 and displayed through the image display unit 116. If there is no profile whose similarity is within the reference value, the controller 118 completes the whole operation.

When comparing the profile of an image to be searched and the profile stored in the database, the reference value is a threshold determining if the image to be searched is similar enough to the image stored in the database. Therefore, if the user draws a desired image by lines and colors, the feature vector of the drawing is extracted and a still image having similar feature vector is retrieved. Consequently, the desired image can be retrieved without inputting the key word by schematically inputting the feature part of the image.

Therefore, if the user draws a desired image by lines and colors, the feature vector of the drawing is extracted and a still image having a similar feature vector is retrieved. Consequently, the desired image can be retrieved without inputting the key word by schematically inputting the feature part of the image.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus for retrieving image information in a computer, comprising:

an image input unit for receiving an image input by a user;

an image size normalizer for normalizing the image to a constant size normalized imgae;

a feature vector extractor for extracting a feature vector of each sub block of the normalized image;

a vector quantizer for quantizing the feature vector to one of a fixed number of quantized levels;

a profile generator for generating an image profile indicating the frequency of occurrence of each quantizing level within the feature vector;

an image data base unit for storing various image information;

an image data base index unit for storing profiles of images stored in the image data base unit;

a similarity comparator for comparing the image profile received from said profile generator with said profiles of images stored in the image data base index unit; and a controller for reading from the image data base unit an image corresponding to a selected one of said profiles of images whose similarity is within a reference value from said image profile and displaying the image corresponding to the selected one of said profiles of images through an image display unit.

2. A method for retrieving image information in a computer, comprising:

receiving an image input by a user;

normalizing the input image to an image of a constant size;

extracting a feature vector of each sub block of the normalized image;

quantizing the extracted feature vector to one of a fixed number of quantizing levels;

generating an image profile indicating the frequency of occurrence of each quantizing level within the feature vector;

comparing the image profile with each one of profiles of images stored in an image data base unit; and reading from said image data base unit an image corresponding to a selected one of said profiles of images whose similarity is within a reference value from said image profile and displaying the image corresponding to the selected one of said profiles of images through an image display unit.

* * * * *